United States Patent
Vasquez et al.

(10) Patent No.: US 8,433,977 B1
(45) Date of Patent: *Apr. 30, 2013

(54) STORAGE DEVICE IMPLEMENTING DATA PATH PROTECTION BY ENCODING LARGE HOST BLOCKS INTO SUB BLOCKS

(75) Inventors: Steven R. Vasquez, Rancho Santa Margarita, CA (US); Patrick J. Lee, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 582 days.

This patent is subject to a terminal disclaimer.

(21) Appl. No.: 12/422,738

(22) Filed: Apr. 13, 2009

Related U.S. Application Data

(63) Continuation of application No. 11/280,017, filed on Nov. 15, 2005, now Pat. No. 7,539,924.

(51) Int. Cl.
*G11C 29/00* (2006.01)

(52) U.S. Cl.
USPC ............. 714/770; 711/4; 711/112; 711/113

(58) Field of Classification Search ............ 714/770; 711/4, 112, 113
See application file for complete search history.

(56) References Cited

U.S. PATENT DOCUMENTS

| | | |
|---|---|---|
| 5,537,421 A | 7/1996 | Dujari et al. |
| 5,613,066 A | 3/1997 | Matsushima et al. |
| 5,691,994 A | 11/1997 | Acosta et al. |
| 5,812,564 A | 9/1998 | Bonke et al. |
| 5,813,025 A | 9/1998 | Murphy et al. |
| 5,822,142 A | 10/1998 | Hicken |
| 5,828,513 A | 10/1998 | Greenberg |
| 6,035,351 A | 3/2000 | Billings et al. |
| 6,044,483 A | 3/2000 | Chen et al. |
| 6,092,231 A | 7/2000 | Sze |
| 6,112,277 A | 8/2000 | Bui et al. |
| 6,125,469 A | 9/2000 | Zook et al. |
| 6,175,686 B1 | 1/2001 | Noda |
| 6,191,712 B1 | 2/2001 | Still |
| 6,324,604 B1 | 11/2001 | Don et al. |
| 6,367,048 B1 | 4/2002 | McAuliffe et al. |
| 6,385,711 B1 | 5/2002 | Colligan |
| 6,467,060 B1 | 10/2002 | Malakapalli et al. |
| 6,532,517 B1 | 3/2003 | Wagner et al. |
| 6,574,774 B1 | 6/2003 | Vasiliev |
| RE38,502 E | 4/2004 | Yonemitsu et al. |
| 6,751,686 B2 | 6/2004 | Takasugi et al. |
| 6,981,171 B2 | 12/2005 | Hashemi |

(Continued)

OTHER PUBLICATIONS

U.S. Appl. No. 11/280,017 to Vasquez et. al, filed Nov. 15, 2005, 23 pages.

(Continued)

*Primary Examiner* — Sam Rizk

(57) ABSTRACT

A storage device is disclosed comprising control circuitry. A write command is received from a host, wherein the write command comprises a host block and corresponding host block address. The host block is partitioned into a plurality of sub blocks, and a plurality of sub block addresses are generated in response to the host block address, wherein each sub block address corresponds to one of the sub blocks. Error detection code (EDC) data is generated for each sub block in response to the sub block and corresponding sub block address. Each sub block and corresponding EDC data are combined to generate a plurality of partial codewords that are written to one or more data sectors corresponding to the sub block addresses.

16 Claims, 6 Drawing Sheets

U.S. PATENT DOCUMENTS

| | | | |
|---|---|---|---|
| 6,988,178 B1 | 1/2006 | Shirai et al. |
| 7,076,603 B1 | 7/2006 | Chheda |
| 7,099,993 B2 | 8/2006 | Keeler |
| 7,178,086 B2 | 2/2007 | Hassner et al. |
| 7,330,417 B2 | 2/2008 | Billau et al. |
| 7,461,202 B2 | 12/2008 | Forrer, Jr. et al. |
| 7,539,924 B1 | 5/2009 | Vasquez et al. |
| 7,559,009 B1 | 7/2009 | Ricci |
| 7,562,282 B1 | 7/2009 | Rothberg |
| 7,574,558 B2 | 8/2009 | Morley et al. |
| 7,647,544 B1 | 1/2010 | Masiewicz |
| 7,840,878 B1 | 11/2010 | Tang et al. |
| 8,006,027 B1 | 8/2011 | Stevens et al. |
| 8,099,651 B2 | 1/2012 | Normoyle et al. |
| 8,122,299 B2 | 2/2012 | Si et al. |
| 8,176,385 B2 | 5/2012 | Uzrad-Nali et al. |
| 8,190,963 B1 | 5/2012 | Wu et al. |
| 8,327,236 B2 | 12/2012 | Ukai |
| 8,397,107 B1 | 3/2013 | Syu et al. |
| 2002/0138694 A1 | 9/2002 | Isshiki |
| 2003/0147167 A1 | 8/2003 | Asano et al. |
| 2003/0163756 A1 | 8/2003 | George |
| 2003/0202270 A1 | 10/2003 | Ng et al. |
| 2004/0019718 A1 | 1/2004 | Schauer et al. |
| 2004/0103360 A1 | 5/2004 | Mori et al. |
| 2004/0255093 A1 | 12/2004 | Forrer et al. |
| 2005/0036381 A1 | 2/2005 | Hassner et al. |
| 2006/0120166 A1 | 6/2006 | Kim et al. |
| 2006/0256624 A1 | 11/2006 | Eggleston et al. |
| 2007/0174678 A1 | 7/2007 | King |
| 2007/0174682 A1 | 7/2007 | King |
| 2007/0186141 A1 | 8/2007 | Hashimoto et al. |
| 2007/0204199 A1 | 8/2007 | Chung et al. |
| 2009/0037793 A1 | 2/2009 | Chuang et al. |
| 2009/0064163 A1 | 3/2009 | Boyd et al. |
| 2009/0150599 A1 | 6/2009 | Bennett |
| 2009/0150637 A1 | 6/2009 | Hattori et al. |
| 2009/0172039 A1 | 7/2009 | Honami et al. |
| 2009/0172250 A1 | 7/2009 | Allen et al. |
| 2010/0011275 A1 | 1/2010 | Yang |
| 2010/0088576 A1 | 4/2010 | Isono et al. |
| 2010/0131723 A1 | 5/2010 | Yorimitsu |
| 2011/0131472 A1 | 6/2011 | Antonakopoulos et al. |

OTHER PUBLICATIONS

Office Action dated Jul. 29, 2008 from U.S. Appl. No. 11/280,017, 10 pages.

Office Action dated Jan. 5, 2009 from U.S. Appl. No. 11/280,017, 6 pages.

Notice of Allowance dated Jan. 15, 2009 from U.S. Appl. No. 11/280,017, 5 pages.

STORAGE DEVICE IMPLEMENTING DATA PATH PROTECTION BY ENCODING LARGE HOST BLOCKS INTO SUB BLOCKS

CROSS-REFERENCE TO RELATED APPLICATIONS

This application is a continuation of U.S. patent application Ser. No. 11/280,017, filed Nov. 15, 2005, and is incorporated by reference in its entirety.

BACKGROUND OF THE INVENTION

1. Field of the Invention

The present invention relates to disk drives for computer systems. More particularly, the present invention relates to a disk drive implementing data path protection by encoding large host blocks into sub blocks.

2. Description of the Prior Art

Disk drives typically employ a number of interacting components that coordinate the transfer of data from a host during write operations, and the transfer of data read from the disk to the host during read operations. FIG. 1 shows an example of a prior art disk drive comprising one or more disks 2 and corresponding heads 3 enclosed in a head disk assembly (HDA) 4. The disk comprises a number of concentric, radially spaced data tracks, wherein each data track comprises a number of data sectors. A voice coil motor (VCM) 6 actuates the heads 3 over the disks 2 to access a target data sector within a target data track during write and read operations. A printed circuit board (PCB) is mounted to the HDA 4, wherein one or more integrated circuits for controlling operation of the disk drive are mounted on the PCB, including a microprocessor (uP) 8 for executing code segments of a control program. The microprocessor 8 typically accesses a fast uP cache 10 (e.g., an SRAM) through a uP cache controller 11 which caches op codes being executed as well as program data.

The code segments of the control program are typically stored on the disk 2 and loaded into an external buffer memory 12 (e.g., an SDRAM) when the disk drive is powered on. As the microprocessor 8 executes the control program, the uP cache controller 11 transfers a burst of corresponding op codes from the external buffer memory 12 into the uP cache 10 for fast access by the microprocessor 8. Since the buffer memory 12 is typically shared with other control components, a buffer controller 14 implements an arbitration algorithm to arbitrate access to the buffer memory 12. Example control components that may share access to the buffer memory 12 include a host interface 16, a disk interface 18, a data cache controller 20, and an ECC controller 22, one or more of which may be integrated with the microprocessor 8 in a system on a chip (SOC), or implemented as separate integrated circuits.

The host interface 16 facilitates data transfer between the disk drive and a host 24 during read and write operations. That is, during write operations the host interface 16 stages the data received from the host 24 in the buffer memory 12 before it is written to the disk 2, and during read operations data read from the disk 2 is staged in the buffer memory 12 before the host interface 16 transfers the read data to the host 24. The disk interface 18 performs the actual interface functions with the HDA 4 in order to write data stored in the buffer memory 12 to the disk 2, and store data into the buffer memory 12 that is read from the disk 2. The data cache controller 20 accesses a data cache area of the buffer memory 12 in order to implement a suitable caching algorithm, and the ECC controller 22 implements a suitable error correction algorithm on data read from the disk 2 and stored in the buffer memory 12.

The microprocessor 8 is typically preempted by a number of interrupts 26 for performing time critical operations in order to maintain optimal performance. For example, a servo controller 28 may generate an interrupt at each servo wedge, signaling the microprocessor 8 that it is time to compute an updated VCM 6 control command for servoing the head 3, or a spindle motor command for controlling the rotational speed of the disk 2. Preempting the microprocessor 8 in order to service the servo interrupts helps maintain optimal performance of the closed-loop servo systems.

The ever increasing complexity of the control program executed by the microprocessor 8 to coordinate the numerous components of the disk drive increases the probability of a programming error resulting in bad data being transferred to the host 24 during read operations. Defects in the integrated storage elements of the buffer memory 12 may also induce errors in the read data transferred to the host 24. To help protect against transferring bad data to the host 24, prior art disk drives have implemented "data path protection" techniques wherein the host block address received during a write operation is used by the host interface 16 to encode error detection code (EDC) data that is appended to the host block written to the disk 2. During a read operation of the host block, check data is generated using the host block address received from the host 24 to verify the integrity of the read data before it is transferred to the host 24. If the check data does not match the EDC data appended to the read host block, the disk drive may return an error to the host 24, or attempt a retry operation.

In prior art disk drives that employ data path protection techniques, each host block is typically mapped to a corresponding data sector. For example, a 512 byte host block may be mapped to a 516 byte data sector, wherein the additional 4 bytes of each data sector store the data path protection EDC data. However, disk drives are now being designed to receive and store host blocks that are significantly larger than the data sectors, for example 4096 byte host blocks. This creates a problem when implementing data path protection that generates EDC data using the host block address, if a large host block must be stored in a number of smaller data sectors.

There is, therefore, a need for a disk drive capable of implementing data path protection when a large host block is stored in a number of smaller data sectors.

SUMMARY OF THE INVENTION

An embodiment of the present invention comprises a disk drive having a disk comprising a plurality of data tracks, wherein each data track comprises a plurality of data sectors. A head is actuated over the disk for accessing the data sectors. A write command is received from a host, wherein the write command comprises a host block and corresponding host block address. The host block is partitioned into a plurality of sub blocks, and a plurality of sub block addresses are generated in response to the host block address, wherein each sub block address corresponds to one of the sub blocks. Error detection code (EDC) data is generated for each sub block in response to the sub block and corresponding sub block address. Each sub block and corresponding EDC data are combined to generate a plurality of partial codewords that are written to the data sectors corresponding to the sub block addresses. A full codeword includes the sub block address, but there is no need to write the sub block address to the disk.

In one embodiment, the EDC data is generated as cyclical redundancy check (CRC) data.

In another embodiment, each sub block address is generated by appending a plurality of bits to the host block address. The plurality of partial codewords are read from the plurality of data sectors corresponding to the sub block addresses, and check data is generated over each sub block within each partial codeword and the corresponding sub block address. An error is detected by comparing the check data to the corresponding EDC data of each partial codeword.

In still another embodiment, the disk drive further comprises a microprocessor operable to execute a control program, and a host interface for receiving the write command from the host and generating the EDC data for each sub block. In one embodiment, the disk drive further comprises a buffer memory, and the host interface stores the partial codewords in the buffer memory. Each partial codeword is then read from the buffer memory, check data is generated over each sub block within each partial codeword and the corresponding sub block address, and an error is detected by comparing the check data to the corresponding EDC data of each partial codeword.

In still another embodiment, a read command is received from the host, wherein the read command comprises the host block address. The plurality of sub block addresses are generated in response to the host block address, and the plurality of partial codewords are read from the plurality of data sectors corresponding to the sub block addresses. Check data is generated over each sub block within each partial codeword and the corresponding sub block address, and an error is detected by comparing the check data to the corresponding EDC data of each partial codeword. In one embodiment, the disk drive further comprises a microprocessor for executing a control program, and a host interface for receiving the read command from the host and generating the check data. In another embodiment, the disk drive further comprises a buffer memory, and a disk interface for generating the check data, detecting the error by comparing the check data to the corresponding EDC data of each partial codeword, and storing each partial codeword in the buffer memory.

Another embodiment of the present invention comprises a method of operating a disk drive, the disk drive having a disk comprising a plurality of data tracks, wherein each data track comprises a plurality of data sectors, and a head actuated over the disk operable to access the data sectors. A write command is received from a host, wherein the write command comprises a host block and corresponding host block address. The host block is partitioned into a plurality of sub blocks, and a plurality of sub block addresses are generated in response to the host block address, wherein each sub block address corresponds to one of the sub blocks. Error detection code (EDC) data is generated for each sub block in response to the sub block and corresponding sub block address. Each sub block and corresponding EDC data are combined to generate a plurality of partial codewords that are written to the data sectors corresponding to the sub block addresses.

DESCRIPTION OF THE PREFERRED EMBODIMENTS

Figure 2:
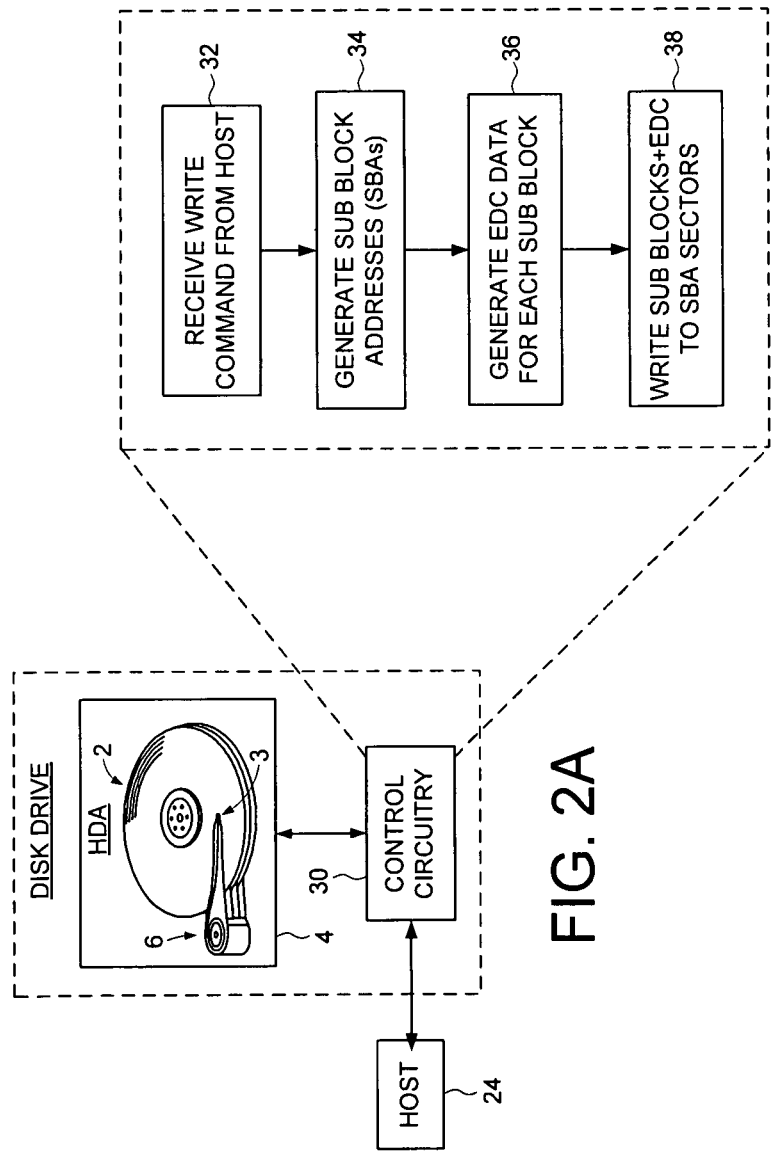
FIG. 2A shows a disk drive according to an embodiment of the present invention comprising a disk, a head actuated over the disk, and control circuitry for implementing data path protection for large host blocks.
FIG. 2B is a flow diagram executed by the control circuitry for receiving a write command from a host, partitioning a large host block into a plurality of sub blocks, generating EDC data for each sub block using a sub block address, combining the sub blocks with the EDC data to form partial codewords, and writing the partial codewords to data sectors corresponding to the sub block addresses.

FIG. 2A shows a disk drive according to an embodiment of the present invention comprising a disk 2 having a plurality of data tracks, wherein each data track comprises a plurality of data sectors. A head 3 is actuated over the disk 2 for accessing the data sectors. The disk drive further comprises control circuitry 30 for executing the flow diagram of FIG. 2B in order to implement data path protection for large host blocks. At step 32 a write command is received from a host 24, wherein the write command comprises a host block and corresponding host block address. At step 34 the host block is partitioned into a plurality of sub blocks, and a plurality of sub block addresses are generated in response to the host block address, wherein each sub block address corresponds to one of the sub blocks. At step 36 error detection code (EDC) data is generated for each sub block in response to the sub block and corresponding sub block address. At step 38 each sub block and corresponding EDC data are combined to generate a plurality of partial codewords that are written to the data sectors corresponding to the sub block addresses. A full codeword includes the sub block address, but there is no need to write the sub block address to the disk.

Any suitable control circuitry 30 may be employed to implement the embodiments of the present invention. In one embodiment, the control circuitry 30 comprises a microprocessor executing instructions, the instructions being operable to cause the microprocessor to perform the steps of FIG. 2B as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 30 comprises suitable logic circuitry, such as state machine circuitry.

In the embodiment of FIG. 2A, the head 3 is attached to the distal end of an actuator arm, which is rotated about a pivot by a voice coil motor (VCM) 6 in order to position the head 3 radially over the disk 2. A spindle motor (not shown) rotates the disk 2, creating an air bearing between the disk surface and head 3 so that the head is said to "fly" just above the disk surface. The spindle motor, VCM 6, disk 2 and head 3 are enclosed in a head disk assembly (HDA) 4, wherein the control circuitry 30 is mounted on a printed circuit board coupled to the HDA 4.

Figure 3:
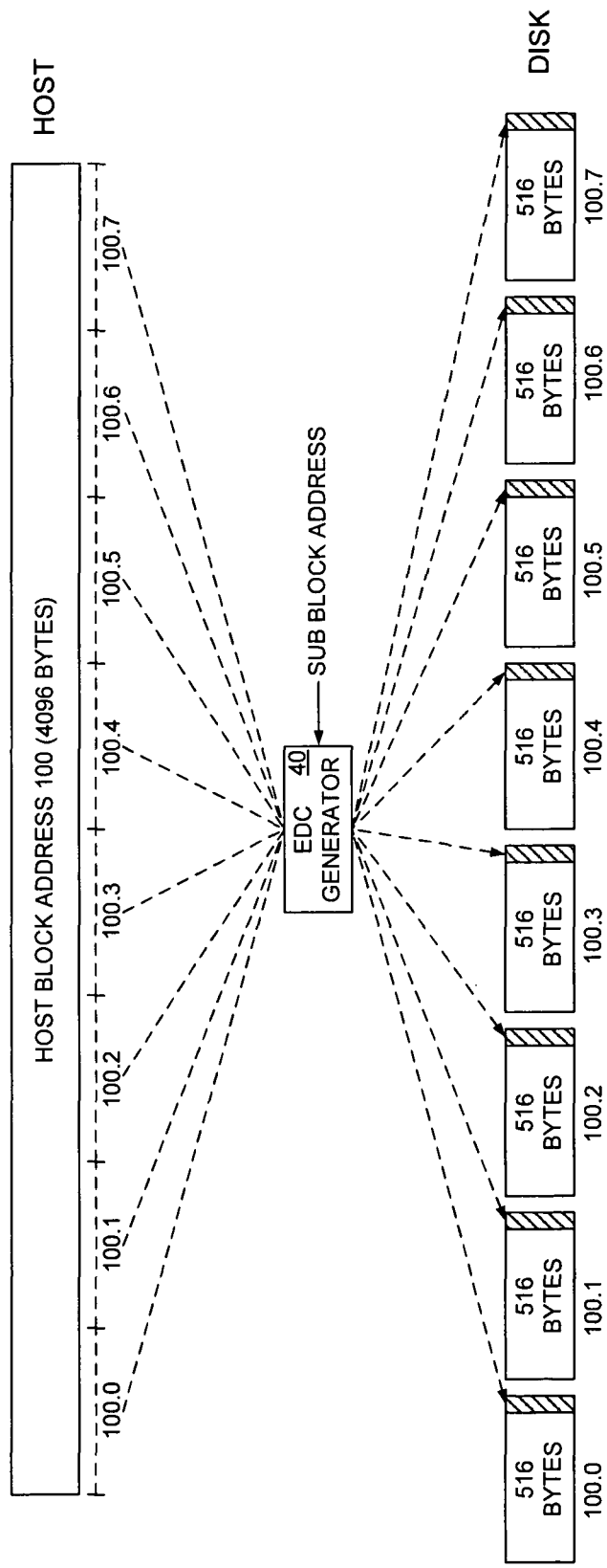
FIG. 3 illustrates an embodiment of the present invention for executing a write command wherein a host block comprising 4096 bytes is partitioned into eight sub blocks, with corresponding sub block addresses used to generate EDC data for each sub block.

FIG. 3 illustrates an embodiment wherein a write command is received from a host, the write command comprising a 4096 byte host block and a host block address of 100. The 4096 byte host block is partitioned into eight 512 byte sub blocks, and eight corresponding sub block addresses are generated in response to the host block address. In the example of FIG. 3, the sub block addresses are generated as fractional addresses 100.0, 100.1, 100.2, 100.3, 100.4, 100.5, 100.6 and 100.7. However, the sub block addresses may be generated in any suitable manner, and in one embodiment, by adding a predetermined number of bits to the host block address. The control circuitry 30 comprises an EDC generator 40 for generating EDC data for each sub block in response to the sub block and corresponding sub block address. In the embodiment of FIG. 3, the EDC data comprises four bytes appended to the 512 byte sub block to form a 516 byte partial codeword written to the data sector corresponding to the sub block address.

Any suitable EDC may be employed in the embodiments of the present invention, such as a cyclical redundancy check (CRC) code. In addition, the EDC generator 40 may comprise any suitable circuitry, and the EDC data may be generated in any suitable manner. In one embodiment, the EDC circuitry comprises a suitable generator polynomial that processes the combined sub block and sub block address, wherein the generator polynomial is seeded with any suitable value. In an alternative embodiment, the generator polynomial is seeded with the sub block address, and the generator polynomial processes the sub block.

In one embodiment, each sub block address corresponds to a logical block address (LBA), which is mapped to an absolute block address (ABA) representing one of the data sectors. The LBA to ABA mapping facilitates the mapping of defective data sectors to spare data sectors. Any suitable algorithm may be employed to implement the LBA to ABA mapping.

Figure 4:
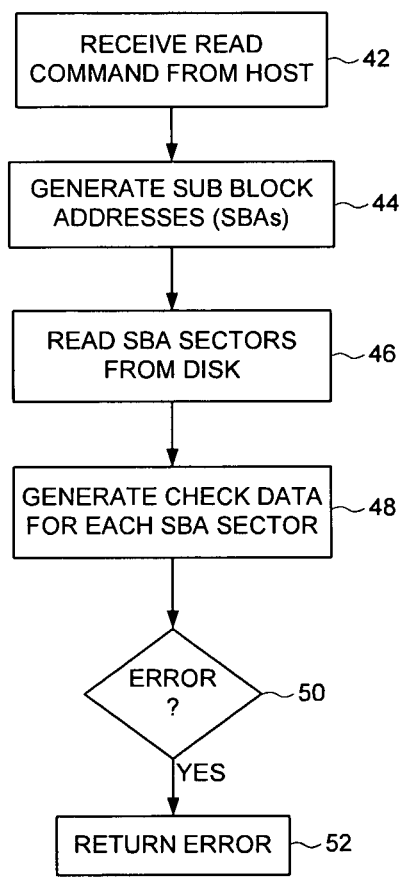
FIG. 4 is a flow diagram executed by the control circuitry for receiving a read command from a host, generating a plurality of sub block addresses from a host block address, reading partial codewords from corresponding data sectors, and detecting data path errors using the appended EDC data.

FIG. 4 is a flow diagram according to an embodiment of the present invention for reading a large host block in response to a read command by reading the corresponding partial codewords from the data sectors and performing data path protection. At step 42 a read command is received from the host 24, wherein the read command comprises a host block address. At step 44 a plurality of sub block addresses are generated from the host block address, and at step 46 the plurality of partial codewords are read from the plurality of data sectors corresponding to the sub block addresses. At step 48 check data is generated over each sub block within each partial codeword and the corresponding sub block address, and if at step 50 an error is detected by comparing the check data to the corresponding EDC data of each partial codeword, then at step 52 an error is returned to the host 24 (or the read operation may be retried).

Figure 5:
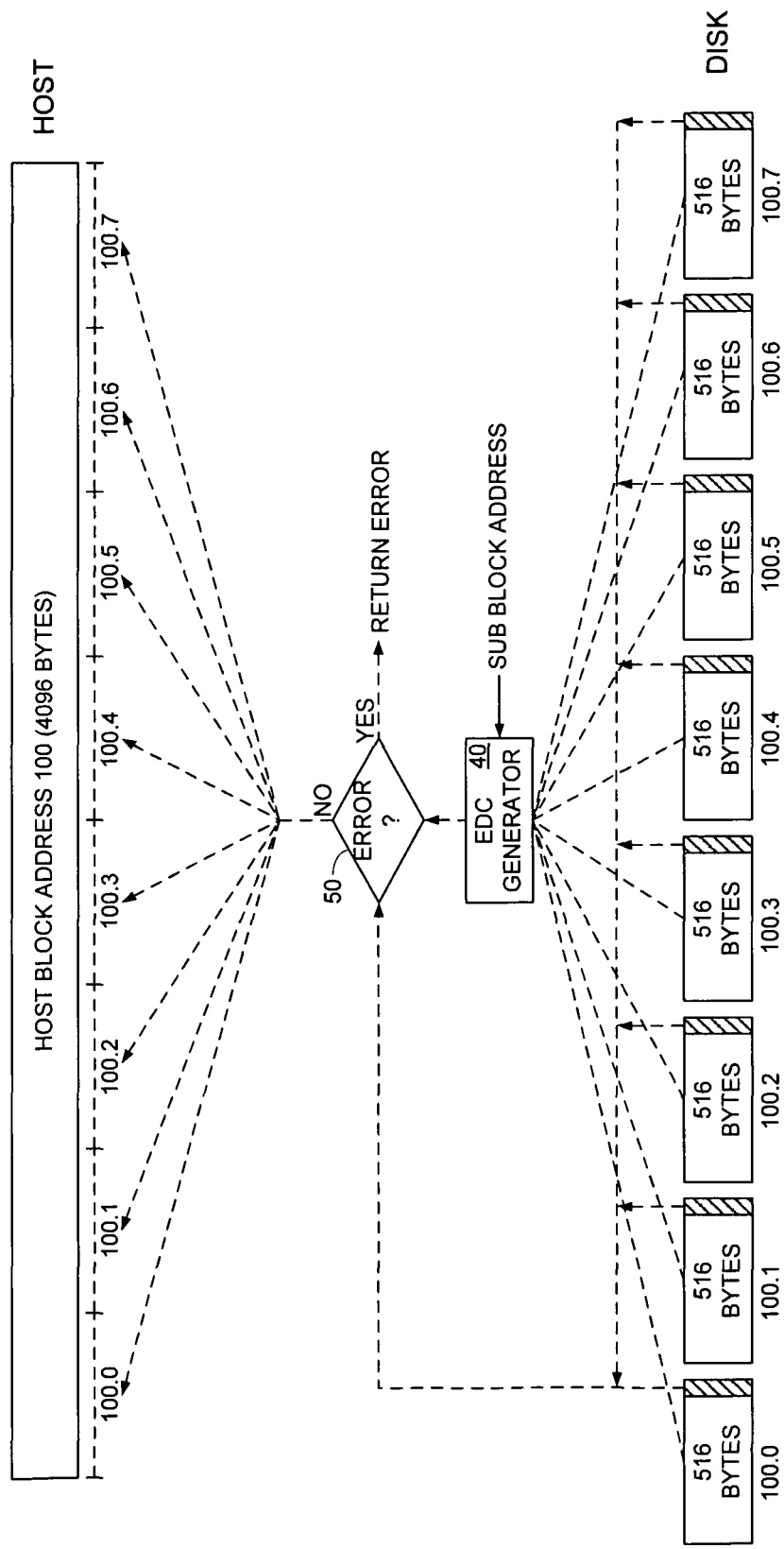
FIG. 5 illustrates an embodiment of the present invention for executing a read command wherein a plurality of sub block addresses are generated from a host block address, the partial codewords are read from the corresponding data sectors, and the appended EDC data is processed to detect data path errors.

FIG. 5 illustrates an embodiment wherein the control circuitry 30 processes a read command received from a host for reading a 4096 byte host block. In this embodiment, the host block address is 100, and the sub block addresses generated from the host block address are 100.0, 100.1, 100.2, 100.3, 100.4, 100.5, 100.6 and 100.7, similar to the sub block addresses generated during the write command illustrated in FIG. 3. The EDC generator 40 processes each sub block address and corresponding sub block within each partial codeword to generate the check data which is compared at step 50 to the EDC data appended to each partial codeword to detect an error. The EDC generator 40 generates the check data in the same manner that it generates the EDC data appended to the sub block during the write operation, for example, using a generator polynomial. If an error is not detected at step 50, then the 512 byte sub blocks are extracted from the 516 byte partial codewords and combined to form the 4096 byte block returned to the host.

Figure 1:
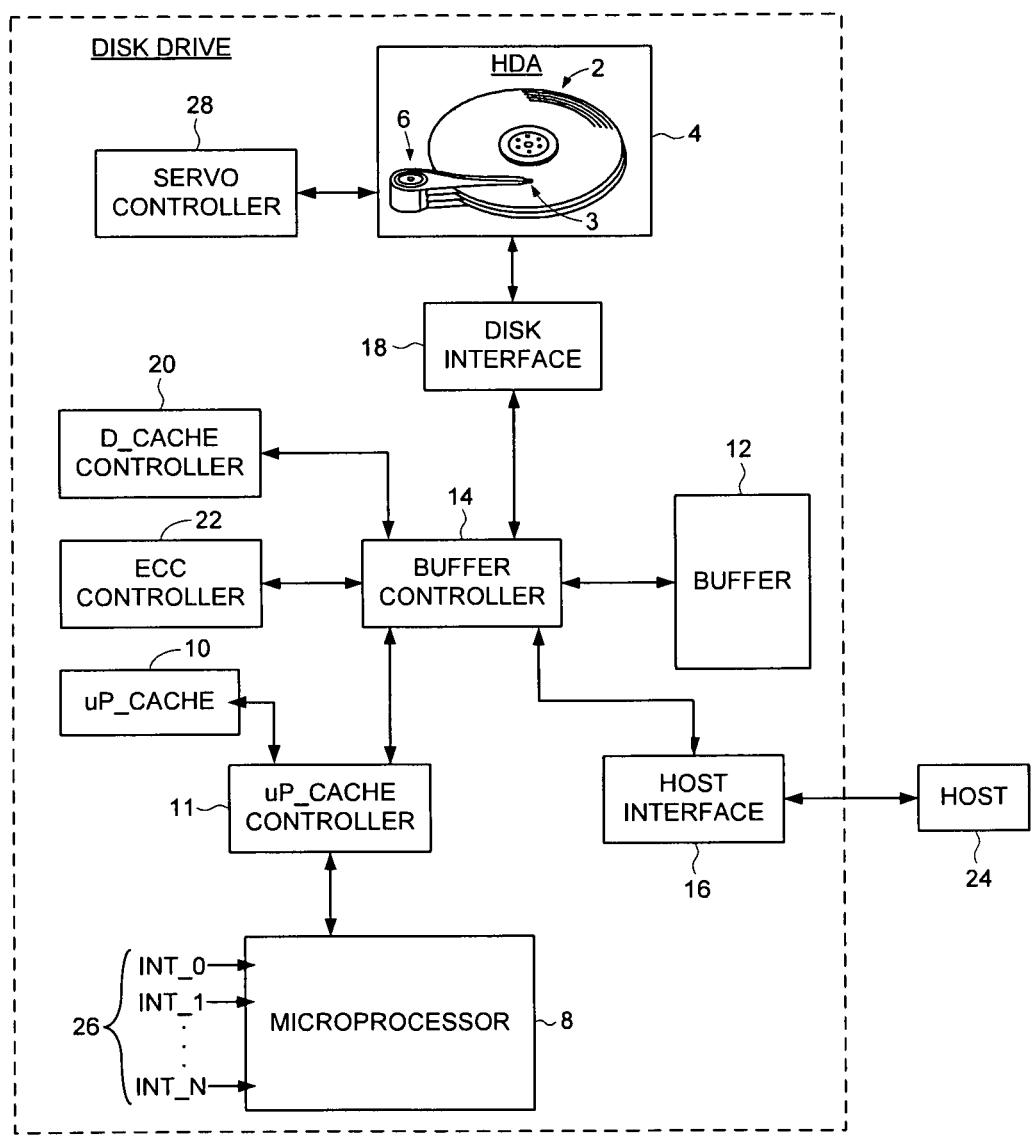
FIG. 1 shows a prior art disk drive comprising various components, including a microprocessor for executing a control program, a host interface for receiving access commands from a host, and a disk interface for implementing the access commands by accessing the disk.
Figure 6:
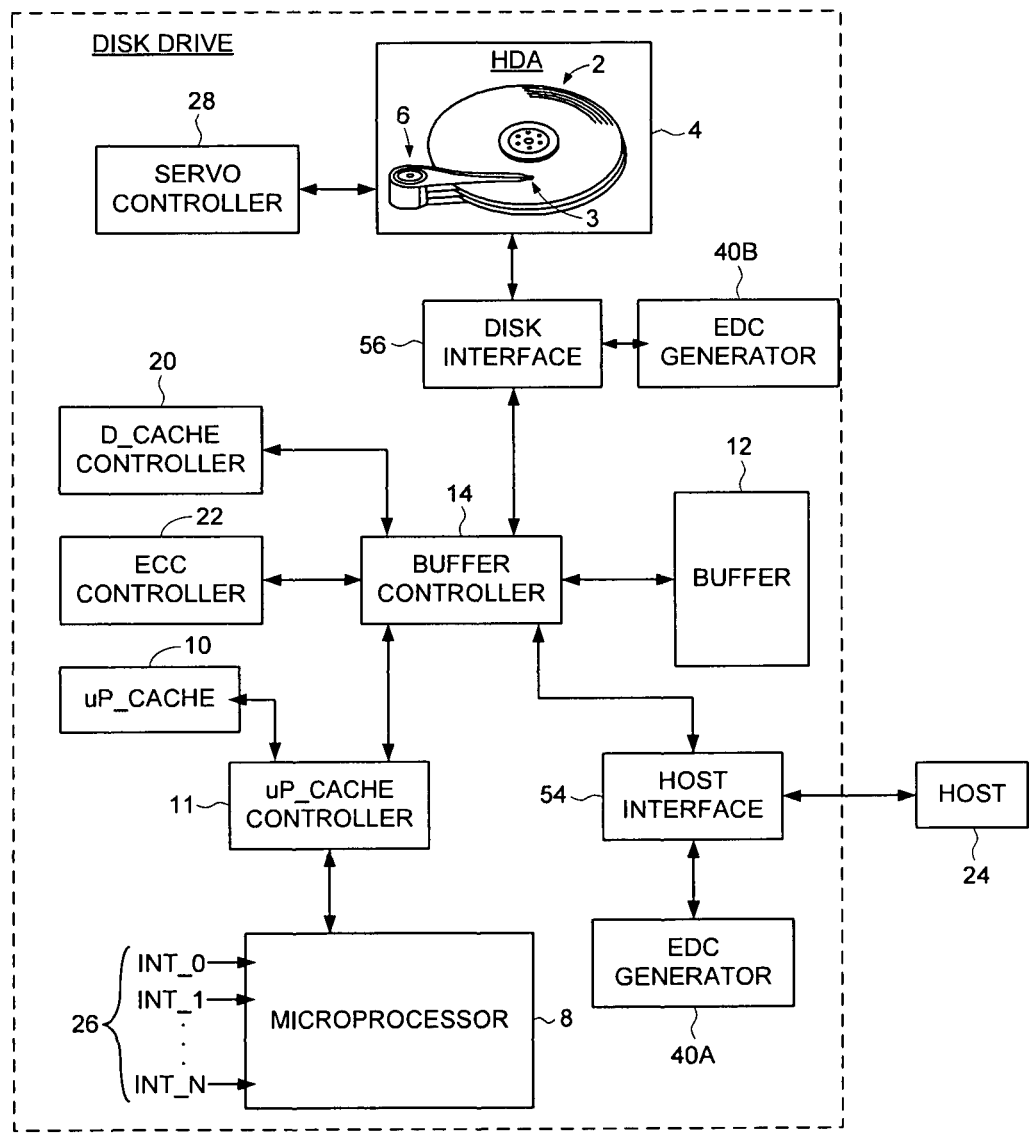
FIG. 6 shows a disk drive according to an embodiment of the present invention comprising a host interface for performing data path checks, a disk interface for performing data path checks, and a buffer memory for staging the partial codewords during write/read operations.

FIG. 6 shows a disk drive according to an embodiment of the present invention wherein the control circuitry 30 comprises a microprocessor 8, uP cache controller 11, uP cache 10, ECC controller 22, data cache controller 20, and servo controller 28 similar to the prior art disk drive shown in FIG. 1. The disk drive of FIG. 6 further comprises a buffer memory 12 and a buffer controller 14 for controlling access to the buffer memory by the various components, including a host interface 54 and a disk interface 56. In one embodiment, the host interface 54 receives the write commands from the host 24 and generates the EDC data for each sub block using an EDC generator 40A. The host interface 54 then stores the resulting partial codewords in the buffer memory 12 for staging before being written to the disk 2. When enabled, the disk interface 56 reads each partial codeword from the buffer memory 12 and generates the check data using an EDC generator 40B. If the check data does not match the EDC data appended to the partial codeword, an error is detected. Otherwise, the disk interface 56 writes the partial codeword to the appropriate data sector identified by the sub block address.

During a read command, the disk interface 56 reads a partial codeword from the data sector identified by the sub block address and again generates the check data using the EDC generator 40B. If the check data does not match the EDC data appended to the partial codeword, an error is generated. Otherwise, the disk interface 56 stores the partial codeword in the buffer memory 12 for staging before being transferred to the host 24. When enabled, the host interface 54 reads each partial codeword from the buffer memory 12 and generates the check data using the EDC generator 40A. If the check data does not match the EDC data appended to the partial codeword, an error is detected. Otherwise, the host interface 54 combines and transfers the sub blocks to the host 24.

In one embodiment, the full codeword (sub block address plus partial codeword) is stored in the buffer memory 12 during read and write operations. In this manner, the control circuitry (host interface 54 and disk interface 56) need only access the buffer memory 12 to generate the check data used to verify each codeword. In an alternative embodiment, the sub block address is stored in a different memory, such as the uP cache 10, as part of a data structure associated with each read/write command.

In one embodiment, the host interface 54, disk interface 56, and EDC generators 40A and 40B are implemented as separate components operating under the control of the microprocessor 8. In an alternative embodiment, the microprocessor 8 executes a control program for implementing the functions of the host interface 54, disk interface 56, and/or EDC generators 40A and 40B.

We claim:

1. A storage device comprising control circuitry operable to:

receive a write command from a host, wherein the write command comprises a host block and corresponding host block address;

partition the host block into a plurality of sub blocks;

generate a plurality of sub block addresses in response to the host block address, wherein each sub block address corresponds to one of the sub blocks;

generate error detection code (EDC) data for each sub block in response to the sub block and corresponding sub block address;

combine each sub block and corresponding EDC data to generate a plurality of partial codewords; and write the partial codewords to one or more data sectors corresponding to the sub block addresses, wherein each of the partial codewords does not include a corresponding sub block address.

2. The storage device as recited in claim 1, wherein the EDC data is generated as cyclical redundancy check (CRC) data.

3. The storage device as recited in claim 1, wherein each sub block address is generated by appending a plurality of bits to the host block address.

4. The storage device as recited in claim 1, wherein the control circuitry comprises:

a microprocessor operable to execute a control program; and a host interface operable to receive the write command from the host and generate the EDC data for each sub block.

5. The storage device as recited in claim 4, wherein:

the control circuitry further comprises a buffer memory;

the host interface is further operable to store the partial codewords in the buffer memory; and the control circuitry further comprises an interface operable to:

read each partial codeword from the buffer memory;

generate check data over each sub block within each partial codeword and the corresponding sub block address; and detect an error by comparing the check data to the corresponding EDC data of each partial codeword.

6. The storage device as recited in claim 1, wherein the control circuitry is further operable to:

receive a read command from the host, wherein the read command comprises the host block address;

generate the plurality of sub block addresses in response to the host block address;

read the plurality of partial codewords from the plurality of data sectors corresponding to the sub block addresses;

generate check data over each sub block within each partial codeword and the corresponding sub block address; and detect an error by comparing the check data to the corresponding EDC data of each partial codeword.

7. The storage device as recited in claim 6, wherein the control circuitry comprises:

a microprocessor operable to execute a control program; and a host interface operable to receive the read command from the host and generate the check data.

8. The storage device as recited in claim 6, wherein:

the control circuitry further comprises a buffer memory; and the control circuitry further comprises an interface operable to:

generate the check data;

detect the error by comparing the check data to the corresponding EDC data of each partial codeword; and store each partial codeword in the buffer memory.

9. A method of operating a storage device, the storage device comprising a plurality of data sectors, the method comprising the steps of:

receiving a write command from a host, wherein the write command comprises a host block and corresponding host block address;

partitioning the host block into a plurality of sub blocks;

generating a plurality of sub block addresses in response to the host block address, wherein each sub block address corresponds to one of the sub blocks;

generating error detection code (EDC) data for each sub block in response to the sub block and corresponding sub block address;

combining each sub block and corresponding EDC data to generate a plurality of partial codewords; and writing the partial codewords to the data sectors corresponding to the sub block addresses, wherein each of the partial codewords does not include a corresponding sub block address.

10. The method as recited in claim 9, wherein the EDC data is generated as cyclical redundancy check (CRC) data.

11. The method as recited in claim 9, wherein each sub block address is generated by appending a plurality of bits to the host block address.

12. The method as recited in claim 9, wherein the storage device further comprises a microprocessor operable to execute a control program, and a host interface operable to receive the write command from the host and generate the EDC data for each sub block.

13. The method as recited in claim 12, wherein the storage device further comprises a buffer memory, the method further comprising the steps of:

storing the partial codewords in the buffer memory;

reading each partial codeword from the buffer memory;

generating check data over each sub block within each partial codeword and the corresponding sub block address; and detecting an error by comparing the check data to the corresponding EDC data of each partial codeword.

14. The method as recited in claim 9, further comprising the steps of:

receiving a read command from the host, wherein the read command comprises the host block address;

generating the plurality of sub block addresses in response to the host block address;

reading the plurality of partial codewords from the plurality of data sectors corresponding to the sub block addresses;

generating check data over each sub block within each partial codeword and the corresponding sub block address; and detecting an error by comparing the check data to the corresponding EDC data of each partial codeword.

15. The method as recited in claim 14, wherein the storage device further comprises a microprocessor operable to execute a control program, and a host interface operable to receive the read command from the host and generate the check data.

16. The method as recited in claim 14, wherein the storage device further comprises a buffer memory, further comprising the step of storing each partial codeword in the buffer memory.

* * * * *